This invention relates to the reduction of chromiferous and titaniferous iron ores such as ilmenite by the fluidized direct reduction non-fusion process. It is an improvement on the iron oxide reduction process more generally described in the Keith et al. Patent, 2,900,246, patented August 15, 1959.

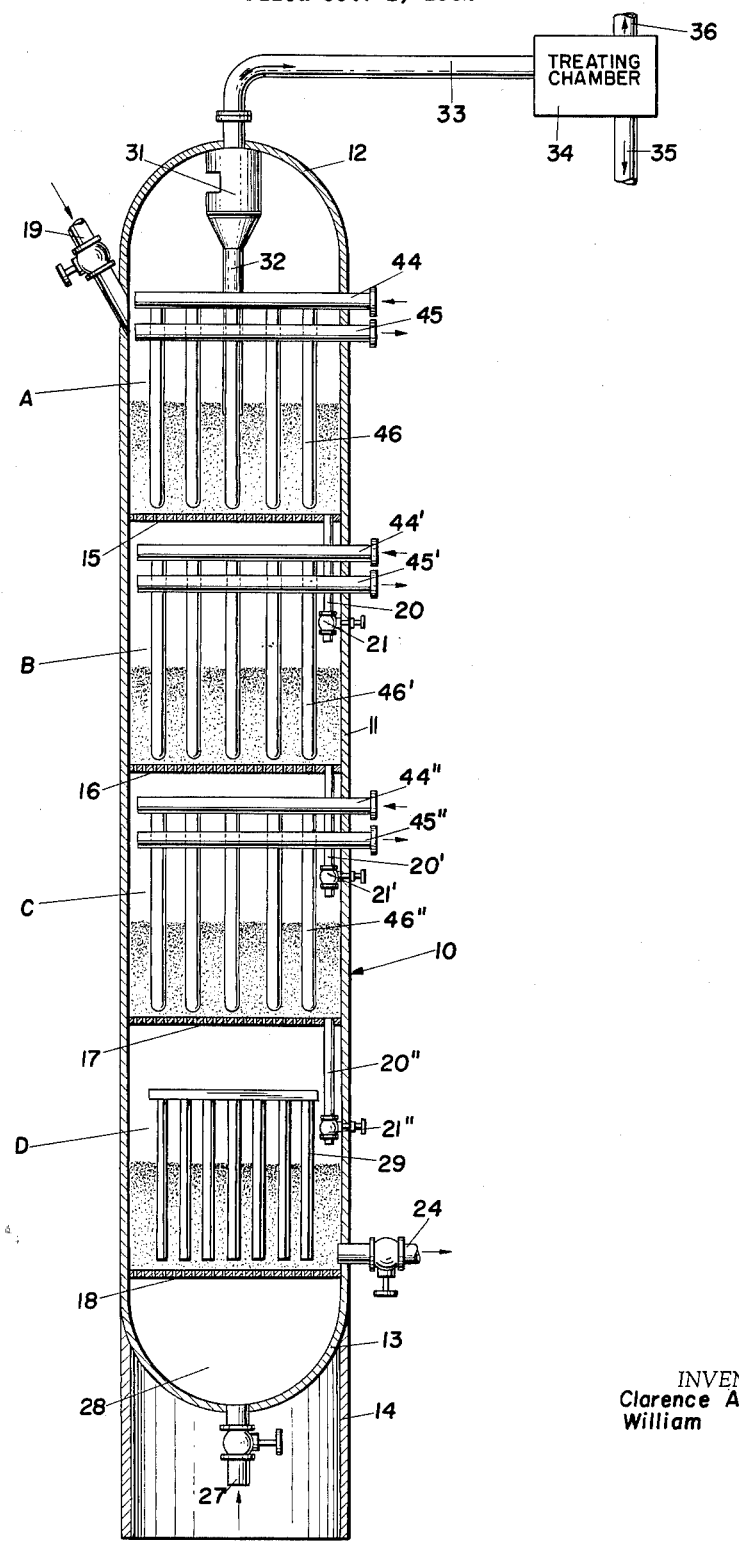
INVENTORS:
Clarence A. JOHNSON
William VOLK 3,224,870
REDUCTION OF ILMENITE AND SIMILAR ORES
Clarence A. Johnson, La Jolla, Calif., and William Volk, Princeton, N.J., assignors to Hydrocarbon Research, Inc., New York, N.Y., a corporation of New Jersey
Filed Oct. 1, 1962, Ser. No. 227,266
5 Claims. (Cl. 75—26)

As pointed out in such patent, finely divided iron oxide, usually an ore concentrate obtained by flotation, magnetic separation, or a like concentrating process, is intimately contacted and reacted with high purity hydrogen at relatively low temperatures, and at substantial superatmospheric pressures under flow velocities of the gas such as to obtain a substantially fluidized mass.

The intimacy and consequent effectiveness of the contact between the iron oxide particles and the high purity hydrogen is such as to establish a high degree of reduction with removal of a water-vapor containing gas from which the unreacted hydrogen can be separated, recompressed, reheated, and recycled to the reactor.

It has been found that the usual iron oxide such as hematite or magnetite could be fluidized and maintained in a fluid condition provided the temperature was not increased beyond about 1000° F. when operating at pressures in the range of about 200–600 p.s.i.g. As pointed out in the aforementioned patent, this was carried out by partitioning the mobilized layer or bed with substantially vertical surfaces which are immersed therein and are spaced from one another in a manner satisfying the condition that the particles in the bed which are farthest from any such surface shall not be less than about one inch, and not more than about six inches away from any such surface.

In accordance with our present invention, we propose to treat a modified ore of the types having a spinel crystal form such as chromiferous ores containing in the order of 2.9% $Cr_2O_3$ and titaniferous ores containing in the order of 8.9% $TiO_2$. With such ores, it has now been found that reduction must be accomplished at temperatures in the order of 1100° F. to 1400° F. and, unexpectedly but perhaps due to the high non-ferrous content, the ores do not agglomerate at such temperatures.

Our invention has for its object a reduction process for reducing chromiferous and titaniferous ores in a fluidized system by the direct reduction process.

More specifically, our invention concerns the economical reduction of iron ores containing chromium or titanium by a direct gaseous reduction.

Further objects and advantages of the invention will appear from the following description of a preferred form of embodiment thereof taken in connection with the attached drawing, the figure of which is a sectional elevation of an illustrative four stage reactor for carrying out the invention.

The reactor 10 is of the type more particularly shown in the Keith Patent 2,995,426, patented August 8, 1961. Such a reactor customarily is a cylindrical tower 11 having a hemispherical top 12 and bottom 13. Reactor 10 is supported on a cylindrical extension 14 of the tower 11 which projects beyond bottom 13 and its associated elements. Extension 14 is usually provided with access openings (not shown) and is of sufficient height to give the desired headroom under bottom 13. The reactor 10 is preferably divided into two or more, and usually three or four separate beds as by the perforated plates 15, 16, 17 and 18. These separate beds or sections are generally designated as A, B, C and D.

Finely divided solids may be supplied to bed A through valved inlet 19. This fluidized bed A of the solids is supported above perforated plate 15 due to the fluidizing gas passing therethrough. Solids from bed A pass to bed B below through discharge tube 20 extending from above perforated plate 15 into bed B. Valve 21 controls the flow of solids through tube 20.

In a similar manner, the solids discharging from tube 20 form fluidized bed B supported by the fluidizing gas passing through perforated plate 16. As already described in connection with bed A, solids may be discharged from fluidized bed B through tube 20' having valve 21' into bed C. Also in a similar manner the solids, under suitable valve control, will be passed on downwardly to the lowermost bed from which they will ultimately discharge through outlet 24.

While the solids flow in succession from the uppermost to the lowermost section of reactor 10, the fluidizing and reacting gas stream flows countercurrently from the lowermost to the uppermost section. The gas stream by line 27 enters plenum chamber 28 disposed below bed D and flows upwardly through the distributing plate 18 and then flows upwardly through bed D. Dummy tubes or rods 29 may be used for desired baffling as set forth in the aforementioned Keith et al. Patent, 2,995,426.

The reducing gas then continues to pass upwardly through beds C, B, and A and then enters cyclone separator 31. Therein residual entrained particles are substantially eliminated from the gas stream and returned to bed A through standpipe 32 and the gas discharges at 33 to treating chamber 34 wherein the hydrogen may be prepared for recycle purposes through line 35 with a purge or vent through line 36.

Reactor 10 is illustrative of a commercial-size vessel typically having a diameter of at least 4 feet and frequently in the range of 10 to 25 feet. In order to quiet the fluidized beds, particularly upper beds A, B and C, the bottoms of which are at least 30 feet above the ground or foundation level, extended vertical baffle surfaces are disposed within the beds to provide a surface-to-volume ratio in the range of 6 to 12 square feet per cubic foot of fluidized solids. These may be a plurality of U-tubes 46 attached to headers 44 and 45 and suspended in bed A so that the portion of the exterior surface of U-tubes 46 in contact with fluidized ore in bed A together with the portion of the inner surface of tower 11 in contact with fluidized bed A falls in the range of 6 to 12 square feet per cubic foot of fluidized solids. The U-tubes 46 may be dummy tubes, i.e., tubes used solely for the purpose of providing extended surface in fluidized bed A, but ordinarily these tubes are used to circulate therethrough a heat exchanger medium to control the temperature of fluidized bed A. Thus, the heat exchange medium may enter header 44, pass down through the legs of U-tubes 46 attached thereto, and flow up the other legs of U-tubes 46 attached to header 45 from which the heat exchange medium may be withdrawn.

In a similar manner, U-tubes 46' carried by headers 44' and 45' in bed B and U-tubes 46" carried by headers 44" and 45" in bed C may be used to control the temperature in the beds. The heating of the bed by the hydrogen in these tubes as taught by Stotler, 2,805,144, is a desirable objective.

In a specific example of the invention, a multiple stage reactor is used for the reduction of chromiferous or titaniferous iron ores by passing high purity (at least 80%) hydrogen through the fluidized beds. The ores, all of which pass through a 20 mesh screen are supplied to bed A through valved inlet 19. The reduction with hydrogen is effected by maintaining a temperature of approximately 1400° F. in fluidized bed A; 1300° F. in fluidized bed B; and 1200° F. in fluidized beds C and D. Since the reduction of chromiferous and titaniferous iron ores by hydrogen is endothermic, the desired temperatures may be conveniently maintained by preheating the hydrogen ultimately used in reactor 10 and passing the preheated hydrogen through the U-tubes 46 disposed in bed A and bed B and bed C if desired. While graduated temperatures are not essential, there is some advantage in having optimum temperatures in the respective beds. It is also within the contemplation of this invention to use a simple bed although better control is usually possible with the multiple bed arrangement.

The solids usually flow through the reactor at regular intervals. In one operation, involving periodic transfer of solids, fluidized bed D is withdrawn by way of valve outlet 24 when 96% by weight of the iron content has been freed of oxygen. Thereupon, fluidized bed C is discharged through valve tube 20″ into bed D with its iron content approximately 90% by weight reduced or freed of oxygen. Next fluidized bed B with approximately 75% by weight of its iron content freed of oxygen is transferred to bed C by way of valved tube 20′. In a similar manner, bed A is transferred through valved tube 20′ when approximately 50% reduced. Then fresh ore is charged through valved inlet 19 to form fluidized bed A. During the transfer of beds through the stages of reactor 10, hydrogen continues to flow upwardly through all beds.

At a superficial velocity of about one foot per second, the hydrogen passing upwardly through the beds maintains the solids in a uniform and quiescent fluidized condition, free of pumping, surging and like irregularities of fluidization encountered in large reactors not having the extended surface of this invention. In some cases, gas velocities of as much as five feet per second can be used, as with somewhat deeper beds and larger particles but we find that the lower velocity of hydrogen is preferable with finely ground ore a substantial part of which will pass through a 325 mesh screen. The fluidized beds have a density of about 100 pounds per cubic foot.

The hydrogen which is introduced into bottom bed D by way of inlet 27 which includes fresh feed but is predominantly recycle hydrogen has a moisture content of only about 0.2% by weight and not to exceed 0.5%, and contains only small percentages of other gases like carbon oxides, methane and nitrogen. The reduction is preferably carried out at an elevated pressure of approximately 100 pounds per square inch gauge but pressures up to as much as 400 pounds per square inch can be used with temperatures in the lower range, i.e., 1100° F. While reduction of at least 90% can be achieved at 1350° F. a reduction of only 60% is practical with some ores and can be obtained under less severe operating conditions.

Subsequent to the reduction, the powder may be melted in a suitable electric furnace and in such case analysis of the slag and the iron shows that practically all of the titanium in the case of the ilmenite and practically all of the chromium in the case of the chromiferous iron ore was accounted for in the slag. By such operation it is thus possible to produce a steel product that is free from the contaminating elements.

In view of the various modifications of the invention which will occur to those skilled in the art, upon consideration of the foregoing disclosure without departing from the spirit or scope thereof only such limits should be imposed as are indicated by the appended claims.

We claim:
1. A process for the separate recovery of high purity iron and substantially iron free non-ferrous oxides selected from the class consisting of titanium oxides and chrome oxides from ores selected from the class consisting of ilmenite and chromiferous ores and concentrates of the same which comprises forming in a contact zone a bed of ore of a fineness to pass a 20 mesh screen, passing a high purity hydrogen gas upwardly through the bed of ore at a velocity to cause mobility of the bed, maintaining said contact zone under a temperature in the range of 1100° F. to 1400° F. and a pressure in the range of 100–400 p.s.i.g.; and for a time sufficient to accomplish at least 60% reduction of the iron oxide in said ore without substantially changing the characteristics of the non-ferrous oxide, and thereafter separating the unreduced non-ferrous oxides from the reduced iron.

2. The process of claim 1 wherein the non-ferrous values are titanium dioxide.

3. The process of claim 1 wherein the non-ferrous values are chromium oxides.

4. A process for the treatment of a metallurgical charge as claimed in claim 1 wherein the charge is primarily ilmenite, the hydrogen has a purity of at least 80% and the reduction temperature is in the range of 1200° to 1400° F. and the iron oxide is at least 90% reduced and the non-ferrous values are separated as unreduced oxides from the iron values.

5. A process as claimed in claim 4 wherein the final separation step is by melting the iron values and recovering the unreduced oxides as slag.

References Cited by the Examiner

UNITED STATES PATENTS

| | | | |
|---|---|---|---|
| 2,638,414 | 5/1953 | Lewis | 75—26 |
| 2,876,091 | 3/1959 | Reed | 75—26 |
| 2,900,246 | 8/1959 | Keith | 75—26 |
| 2,912,320 | 11/1959 | Chang | 75—26 |
| 2,996,373 | 8/1961 | Agarwal | 75—34 |
| 3,022,156 | 2/1962 | Eastman | 75—26 |
| 3,053,648 | 9/1962 | Stephens et al. | 75—26 |

FOREIGN PATENTS 140,498   3/1951   Australia.

BENJAMIN HENKIN, *Primary Examiner.*